United States Patent [19]

Briggs

[11] Patent Number: 4,867,619

[45] Date of Patent: Sep. 19, 1989

[54] HIGH SPEED SPINDLE WITH ADJUSTABLE TOOL

[75] Inventor: Godfrey T. Briggs, Tecumseh, Canada

[73] Assignee: Colonial Tool Operations Division of Textron Canada Ltd., Windsor, Canada

[21] Appl. No.: 254,980

[22] Filed: Oct. 7, 1988

[51] Int. Cl.[4] .............................................. B23B 21/03
[52] U.S. Cl. ....................... 408/158; 408/12; 408/168; 408/171; 82/1.2; 82/147
[58] Field of Search ................. 82/1.2, 147; 408/12, 408/158, 168, 171

[56] References Cited

U.S. PATENT DOCUMENTS

| | | | |
|---|---|---|---|
| 955,180 | 4/1910 | Mason | 408/168 |
| 3,216,287 | 11/1965 | Pleger et al. | 82/147 |
| 3,391,585 | 7/1968 | Griswad et al. | 408/158 |
| 3,530,745 | 9/1970 | Milewski | 408/158 |
| 3,740,161 | 6/1973 | Milewski | 408/158 |
| 3,884,590 | 5/1975 | Skrentner et al. | 408/158 |
| 4,037,496 | 7/1977 | Gerth | 82/142 |
| 4,416,569 | 11/1983 | Yamakage et al. | 408/168 |
| 4,580,471 | 4/1986 | Oyama et al. | 82/142 |
| 4,602,539 | 7/1986 | Tsukiji | 82/1.2 |
| 4,615,652 | 10/1986 | Van Sickle et al. | 408/161 |

Primary Examiner—Robert P. Olszewski
Assistant Examiner—William E. Terrell
Attorney, Agent, or Firm—John C. Evans

[57] ABSTRACT

A high speed spindle has a motor and tool adjustment mechanism which aligns spaced bearing means to rigidly support the spindle shaft at high speed operation and to prevent excessive lateral loading of a bearing unit of the tool adjustment mechanism. The unitary motor and tool adjustment mechanism are joined together as a single unitary assembly which is mountable on a machine tool base without requiring alignment and preassembly of the motor and tool adjustment mechanism at field locations.

5 Claims, 4 Drawing Sheets

HIGH SPEED SPINDLE WITH ADJUSTABLE TOOL

This invention relates to spindles with adjustable tools and more particularly to boring cutters which are driven by rotatable spindles and which have a actuating rod which is directed colinearly of and through a hollow spindle drive shaft to position the radial position of a cutting element on a boring cutter bar connect to the outboard end of the spindle shaft.

BACKGROUND OF THE INVENTION

In order to machine parts to close tolerances it is desirable to provide built-in automatic adjustment means for changing the position of a cutting tool with respect to the workpiece. In the case of boring cutters one approach has been to connect the cutting tool on a cutting bar connected to the outboard end of a spindle shaft. The spindle shaft has a hollow configuration and an actuating rod for the mechanism is directed through the hollow shaft to vary the position of the cutting tool following a boring operation to avoid tool drag marks on the surface of a bore finished by the cutting tool.

An example of such a machine tool is set forth in U.S. Pat. No. 3,740,161 where the adjustment means is located in a housing mounted on a machine table separately from the spindle housing. In such cases the spindle housing must be assembled as a separate unit; the adjustment means is separately assembled and then the individual pieces must be separately assembled on the machine base. Such units, if replaced separately require different craftsmen and depending upon plant classification systems may require electricians, millwrights, machinists and/or riggers to make changes or repairs to the assembly.

Furthermore, the use of a separate spindle, a separate drive motor and a separate adjustment mechanism require drive train arrangements which will direct substantial lateral loadings on bearing components in the adjustment mechanism which overtime can cause excessive wear therein. In the case of the '161 patent parts of the adjustment mechanism are isolated from the spindle drive by use of flexible couplings but the bearings which support the actuating rod for rotation concurrently with the rotation of the spindle shaft are located so as to be subject to some transverse or lateral loading unless the component parts are very precisely aligned coaxially. Such alignment is difficult to achieve under field installation, repair and replacement circumstances.

SUMMARY OF THE INVENTION

An object of the present invention is to provide a unitized high speed spindle with a integral motor and adjustment mechanism which can be installed and replaced as a single unit on the base of a machine tool.

Another object of the present invention is to provide such a unitized high speed spindle which has a bearing arrangement that supports the spindle shaft rigidly at speeds up to 7200 revolutions per minute to prevent movement of the spindle shaft axis more than 0.00005 inch from its at rest position.

Still another object of the present invention is to provide a unitized high speed spindle assembly which has aligned spindle housing, motor housing and adjustment mechanism housings integrally connected as a unit and bearing support means which prevent excessive laterally loading of bearing components in the adjustment mechanism which provide for actuator rod rotation during rotation of the spindle shaft.

One feature of the present invention is provide a simplified rigid bearing assembly for the spindle shaft which includes location of the main bearing assemblies in the spindle housing and which includes only one bearing point between the spindle shaft and the motor housing and which includes only one bearing point between the actuator rod and the actuator housing.

Still another feature of the present invention is to provide a housing for the actuating mechanism which is rigidly connected to one end of the motor housing by a pilot which provides a rigid axial alignment between the housing arrangements and which prevents the transfer of lateral forces on the bearings for the actuating mechanism during spindle boring operation.

These and other objects and advantage of this invention will be readily understood by those acquainted with the design and use of boring spindles from the following specification and accompanying drawings.

DETAILED DESCRIPTION OF THE PREFERRED EMBODIMENT

Figure 1:
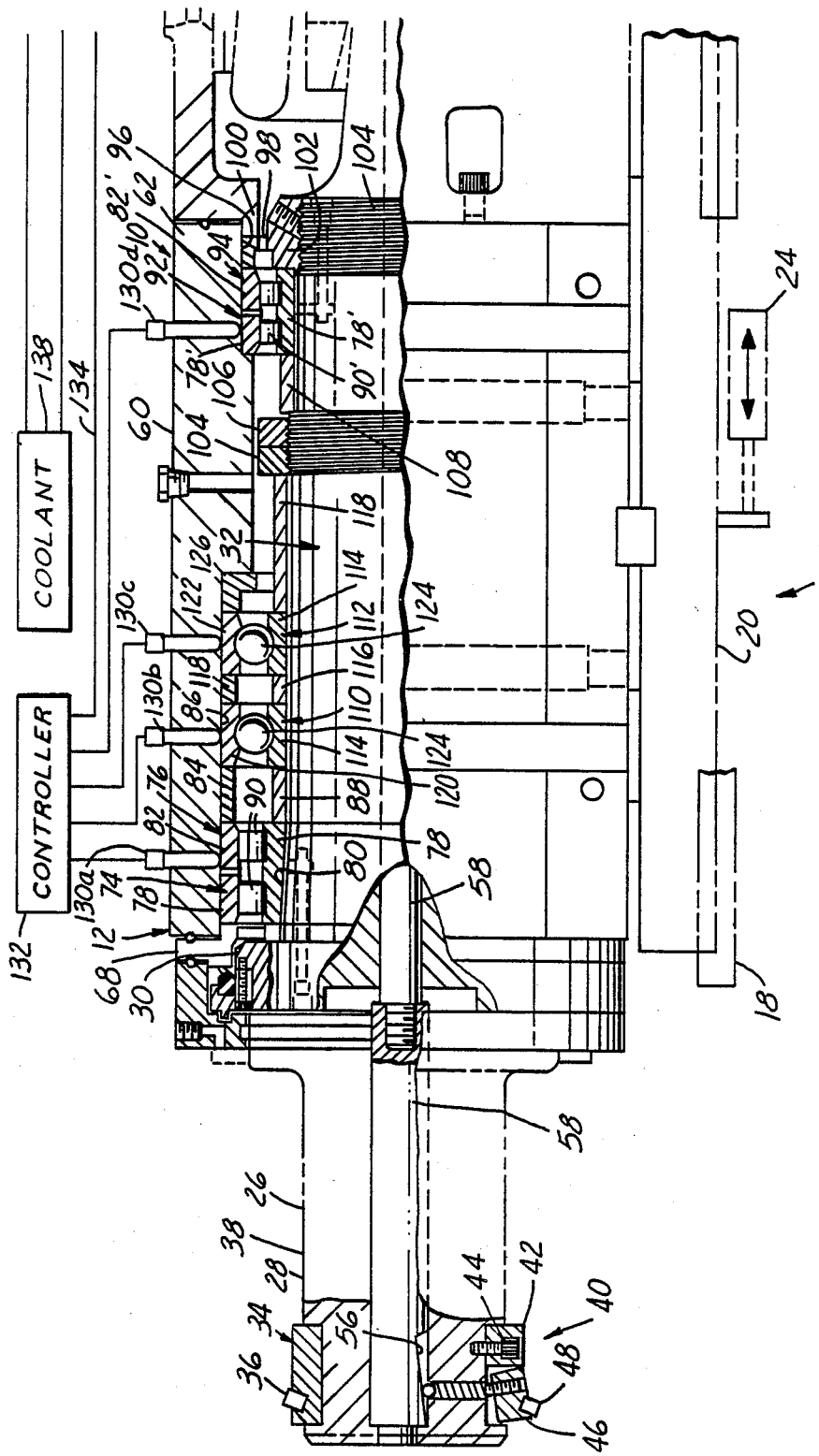
FIG. 1 is the first part of a cross sectional view taken longitudinally through the cutting tool and spindle assembly with schematically illustrated accessory parts.
Figure 2:
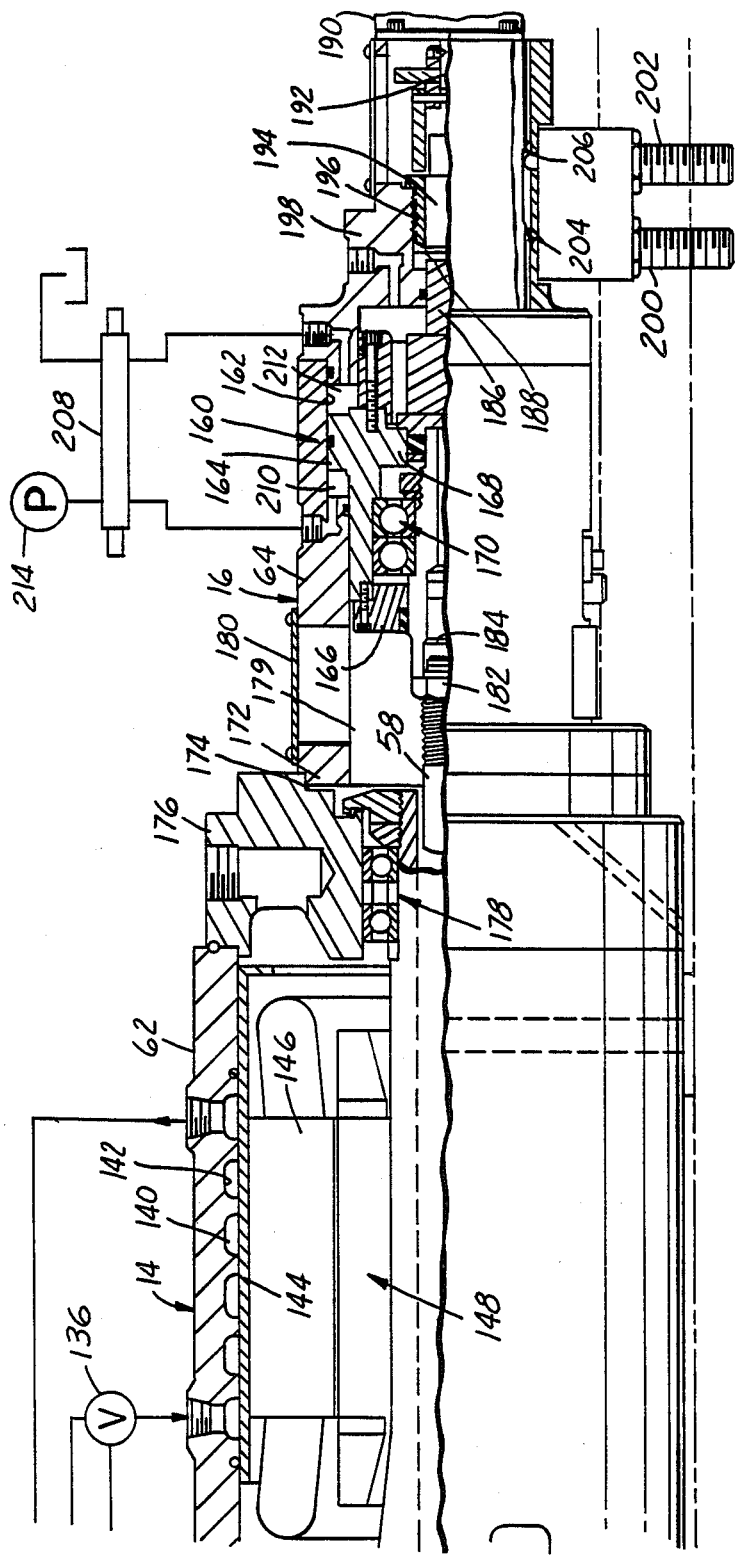
FIG. 2 is the second part of a cross-sectional view taken longitudinally through the cutting tool and spindle assembly of the present invention.
Figure 3:
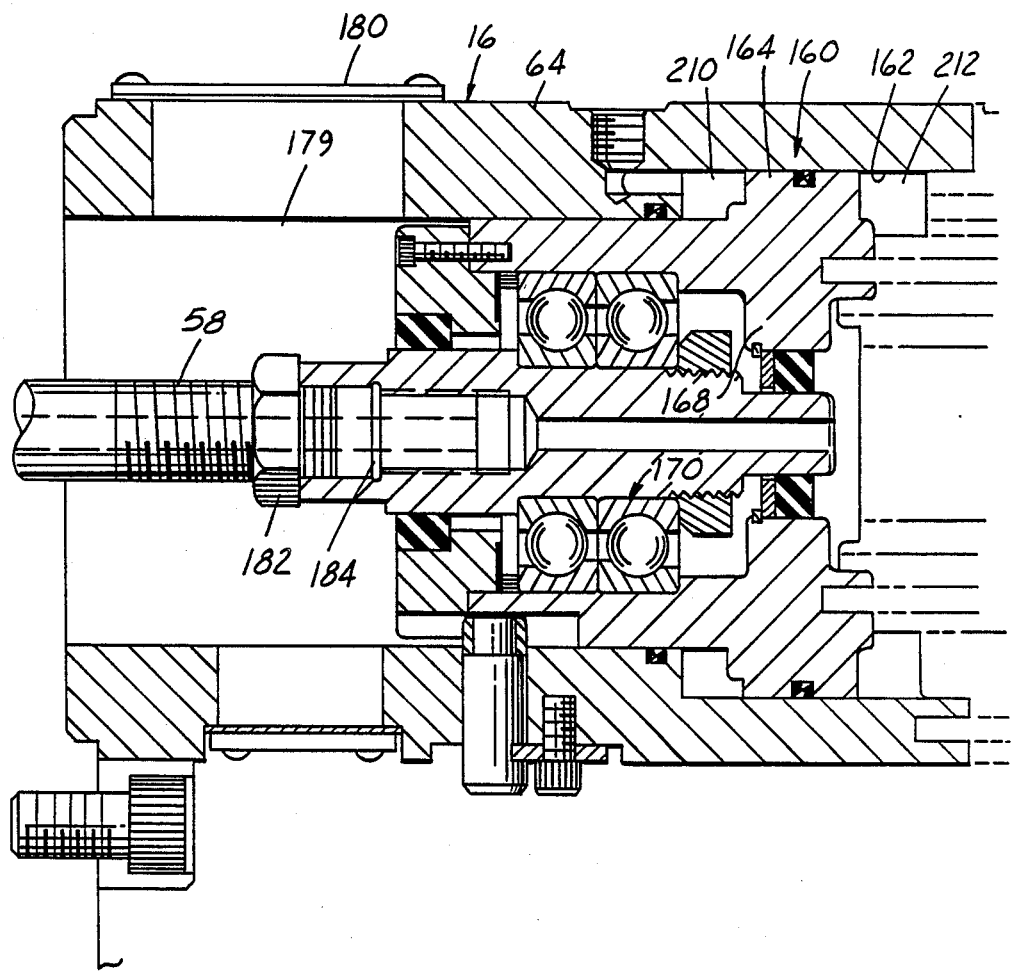
FIG. 3 an enlarged fragmentary sectional view of the actuating mechanism of the present invention.
Figure 4:
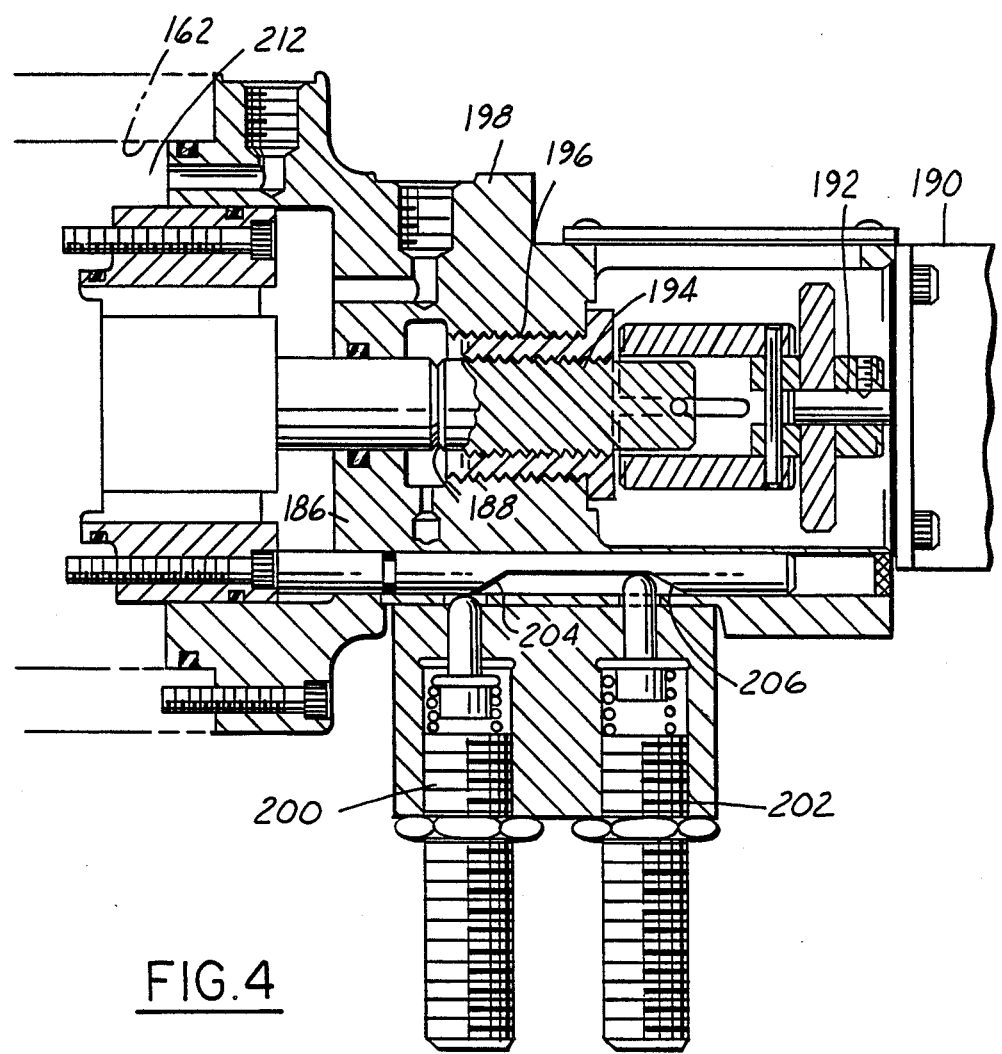
FIG. 4 is an enlarged fragmentary sectional view of the connection between the pilot on the housing for the actuating mechanism and the aft end of the motor housing.

Referring to FIGS. 1 and 2, a unitized spindle, motor drive and actuator mechanism 10 is illustrated. The mechanism includes a high speed spindle 12, a drive motor 14 and an actuating mechanism 16 formed as a unitized assembly which can be supported as a single unit on the fixed ways 18 by the reciprocated table 20 on a single or multiple slide type boring machine 22.

The boring machine 22 includes conventional controls which provide for known boring strokes and control operations in such machines which form no part of the present invention with it only being understood that the unitized assembly 10 is carried by the table 20 toward and away from the workpiece by suitable hydraulic or motor driven ball screw drive mechanisms diagrammatically shown at 24.

The present invention more specifically includes a boring tool assembly 26 having a boring bar or nose 28 connected by suitable fasteners to a large diameter flange 30 on the end of a hollow spindle shaft 32. The bar 28 carries a fixed position coarse cutting tool 34 with a replaceable cutting insert 36 extending a fixed radial distance from the outside surface 38 of the bar 28. The bar 28 also carries a radially adjustable fine cutting tool 40 having a fixed end 42 thereof held rigidly to the bar 28 by a fastener screw 44 and a flex end 46 thereon moveable with respect to the outside surface of the bar 28. The flex end 46 carries a replaceable fine cutter insert 48 and a stop screw 50 which engages a positioning pin 52 and ball 54. The ball 54 rides on a ramp 56 formed on one end of an actuating shaft 58 which extends through the hollow spindle shaft 32 from the flanged end thereof to the aft-most segment thereof.

The ramp 56 is inclined in a direction and at a slope which will position the fine cutter insert 48 at different cutting radius points depending upon the amount of material to be removed from the workpiece bore during a spindle boring operation which finishes the coarse cut by insert 36 and as such has a greater cutting radius than insert 36 when the ramp 56 is in its solid line position as shown in FIG. 1. The coarse cutter insert 36 is arranged at a first diameter to remove a first amount of material from a workpiece bore during which the actuating shaft 58 is positioned to allow the finish cutting insert 48 to be positioned to an inboard non-cutting position in the workpiece bore. Following the boring stroke the ramp will assume a tool retract position (shown in phantom line) at which point the flex end 46 will be free to spring toward the outside surface 38 of the bar 28 so as to position the cutting insert 48 radially inboard of the just finished bore surface on the workpiece thereby assuring that the boring tool can be removed from the workpiece without leaving tool marks on the bore surface.

In the past such tool adjustment systems have included an adjusting mechanism separate from the spindle drive and spindle housing. Such separate adjusting mechanisms had to be carefully axially aligned with the bearing system of the spindle shaft and the drive systems (usually offset drive motors with pulley and belt components coupling the drive motor to the spindle and adjustment mechanism) to avoid excessive lateral loading on the bearings in the adjustment mechanism which were required to allow concurrent rotation of the actuating shaft 58 and the spindle shaft 32.

In accordance with the present invention such alignment and lateral load problems are solved by the provision of a spindle housing 60 keyed to the table 20 which has its aft end 62 connected to a motor housing 64 which in turn is connected to a adjustment mechanism housing 66. Each of the housing 60, 64 and 66 are provided with reference bores therein which will support bearing means to be described which in turn accurately and precisely align the spindle shaft 32 and the actuating shaft 58 so as to avoid excessive lateral loading on the component parts of the adjustment mechanism 16 during the boring operations.

The housings 60, 64 and 66 together define a unitized housing which enables the unitized assembly 10 to be connected as a single unit to the table 20 either during assembly or for field replacement and repair thus eliminating various kinds of operations as was the case with prior art assemblies which had separate spindle, motor drive and adjustment mechanisms.

More specifically, the spindle housing 60 has a bearing retainer 68 mounted on the outboard end 70 thereof. The retainer 68 engages the outboard race 72 of a pair of roller bearing assemblies 74, 76 which have a single inner race 78 press fit on an inwardly inclined surface 80 of the spindle shaft 32 located immediately inboard of the flange 30 thereof. The outboard race 82 of the roller bearing assembly 76 engages a retainer 84 fit in a bore 86 of the housing 60 and the inboard race 78 engages a retainer ring 88 on the outer surface of the shaft 32. Each of the bearing assemblies 74, 76 has a plurality of roller bearing elements 90 therein which provide only radial support for the shaft 32 as it is rotated during a high speed boring operation.

A like pair of roller bearing assemblies 92, 94 are provided on the spindle housing 60 in a bore 96 formed in the aft end 62 as best seen in FIG. 1. For purposes of description reference may be had to the detailed description of the bearing assemblies 74, 76 to define like components which are identified in the assemblies 92, 94 with like reference numerals primed, e.g. roller elements 90 in bearing assemblies 74, 76 are roller elements 90 in bearing assemblies 92, 94. As in the case of bearing assemblies 74, 76 the bearing assemblies 92, 94 serves to only radially support the shaft 32 near the inboard end 32a of the large diameter length segment 32b thereof.

The bearing assemblies 92, 94 have a slightly smaller configuration than the assemblies 74, 76 to accommodate reduced inboard loadings but nevertheless define an extended bearing footprint which defines a rigidity in shaft 32 at high speed operation that will hold the shaft axis closely to the at rest position to assure high accuracy boring operations on the order of 0.0004 inch maximum cylindricity over 4 inch diameter×8 inch long bores in the part being machined by the present invention. The bearing assemblies 92, 94 are held in the bore 96 by a retainer ring 98 which engages a annular extension 100 on the motor housing 62. The inner race 78 prime is held in place by a threaded retainer 102 which is received on the threaded end 104 of segment 32b and a pair of retainer rings 104, 106 threaded on the segment 32b to hold a inboard retainer 108 in place against the bearing assemblies 74, 76.

In addition to the radial support for shaft 32 the present invention includes a pair of roller bearing assemblies 110, 112 which are located nearer the pair of bearings 74, 76 to provide axial only support of the shaft 32 near its outboard end where it assumes the greatest loading during the boring operation. The roller bearing assemblies each have an inner race 114 located on the shaft 32 by retainer ring 88 and spaced additional retainer rings 116, 118. The roller bearing assembly 110 has an outer race 120 which is shaped to support axial loads inboard of the housing 60 and the roller bearing assembly 112 has an outer race 122 which is shaped to support opposite axial loads. Each of the roller bearing assemblies has a plurality of ball bearing elements 124 which provide for relative rotation of the shaft 32 with respect to the housing as axial loads thereon are accommodated. An L-shaped retainer 126 is located in the inboard end of the bore 86 to engage and reference one end of the bearing race 122 which has its opposite end in engagement with a retainer ring 128.

Each of the aforedescribed bearings have an accessory thermocouple 130a–130d which is connected by suitable leads to a controller 132 which in turn produces output signals on line 134 for controlling a cooling liquid valve 136 for regulating flow of coolant from a source 138 through annular cooling passages 140 formed between a grooved segment 142 of the motor housing 62 and a cooling sleeve 144 which surrounds the stator winding 146 of an electrical drive motor 148 for driving the shaft 32 during a boring operation.

The thermocouples 130a–130d sense high temperature conditions at the bearing assemblies which might cause misalignment of the rigid support surfaces which are required for rigid at speed operation of the boring tool 26. The circulating coolant will remove heat generated by high speed motor operation to prevent such misalignment.

Another aspect of the present invention is that the electrical drive motor 128 has its rotor 150 mounted integrally on the shaft 32 so as to directly drive it without the need for accessory pulleys and belts which can impose lateral loadings on both the bearings of the spindle and those of the adjusting mechanism 16. While such lateral loadings can be accommodated by some spindle bearings they are generally of a magnitude which will produce undesirable wear in the bearing units of adjusting mechanisms presently sold for use in controlling the radial position of bore cutters.

More, specifically the adjustment mechanism 16 in the illustrated embodiment includes a double acting hydraulic motor 160 with a housing bore 162 in which a piston 164 is mounted for reciprocation. The piston 164 has its opposite ends connected to seal assemblies 166, 168 which seal the piston on either end of a bearing assembly 170 which enables the adjusting shaft 58 to rotate with the spindle shaft 32 and boring tool 26. The bearing assembly 170 is not subjected to high lateral loads since the housing 64 includes a pilot ring 172 thereon which extends into a precision bore 174 in a retainer 176 for a motor bearing assembly 178. The pilot ring 172 precisely axially aligns the component parts of the adjusting mechanism with the spindle assembly 60 and the drive motor assembly 14 while providing a point of connection which incorporates the adjusting assembly 16 as part of a unitized structure which can be mounted in a single step to the reciprocating table of a boring machine tool.

The housing 64 include an access port 179 with a cover 180 which when removed provides access to an adjustment nut 182 for adjusting the position of a stop surface 184 for establishing the release position of the adjusting shaft 58 which will position the ramp 56 to cause the fine cutting insert 48 to be located radially inwardly. The aft end of the shaft 58 includes an extension 186 which is engageable with an adjustable stop surface 188 that is positioned by a stepper motor 190 in accordance with signals which automatically control the desired cutting position of the fine cutter insert 48 during the finish boring operation.

More particularly, the stepper motor 190 has fifty incremental stop positions which precisely locate an output shaft 192 thereof to thread a driven member 194 with respect to a threaded guide 196 on the end 198 of the housing 64. As the driven member 194 threads with respect to the guide 196 the stop surface 188 thereon is moved axially to produce a greater or lesser shift in the position of the ramp 56 from its release position with such shifts representing precise radial positioning of the cutter 48 automatically.

Limit switches 200, 202 are provided which have movable contacts shift by cam surfaces 204, 206 of the unitized assembly to condition the adjusting mechanism 16 by selectively energizing solenoids of a valve 208 to selectively connect chambers 210, 212 of the double acting motor with a pump 214 for supplying hydraulic pressure. When the unitized system is shifted by the table to position the switches as shown in FIG. 2, the pump 214 supplies pressure to chamber 210 to condition the adjusting assembly 16 to hold the adjusting shaft 58 against the stop 188 which in turn places the fine cutter in its cutting position during a finishing stroke by the boring machine.

When the switch positions are reversed the chamber 212 is pressurized to shift the piston 164 to cause the shaft 158 to move outwardly through the boring tool 26 to release the cutter insert 58 into the release position so that the tool 26 can be removed from the workpiece bore without leaving tool marks on the finished bore surface.

What is claimed is:

1. In a machine tool assembly having a spindle housing, a spindle shaft directed therethrough and a draw bar directed through the spindle shaft for adjusting the position of a cutting tool mounted on the output end of the spindle shaft the improvement comprising:

first, second and third bearing means supported on said spindle housing for rotatably supporting said spindle shaft;

said first and second bearing means each including a pair of bearing races located at opposite ends of said spindle housing; each of said bearing races having a plurality of roller elements thereon for radially supporting said spindle shaft;

said third means being including a pair of bearing races located in said housing between said first and second bearing means and nearer said first bearing means than said second bearing means; said third bearing means including a plurality of ball bearing elements supported on each of said bearing races for axially supporting said spindle shaft;

a motor housing directly connected to one end of said spindle housing electric motor means for driving said spindle shaft;

said electric motor means including stator means supported on said motor housing and rotor means connected to said spindle shaft for rotating said spindle shaft with respect to said spindle housing in a range of 3600 to 7200 revolutions per minute; and fourth bearing means constituting the sole means for supporting said spindle shaft on said motor housing and said fourth bearing means being located near only one end of said motor housing;

said first, second and third bearing means maintaining a rigidity at full operating speed of said spindle shaft to maintain the axis thereof within plus or minus 50 millionths of an inch.

2. In the machine tool assembly of claim 1, positioning means for controlling the stroke of said draw bar and for controlling the amount of radial cut by the cutter tool, said positioning means including a driven member for adjusting the axial position of said draw bar with respect to said spindle shaft to control the radial location of a cutting tool with respect to a workpiece bore for controlling the amount of material removed from the workpiece bore by said cutting tool during spindle rotation;

said positioning means including a housing having bearing means for rotatably supporting said driven member;

and pilot means on said housing directly rigidly connecting said last mentioned housing on one end of said motor housing thereby to prevent excess lateral loading of said last mention bearing means during rotation of said spindle shaft as material is cut from a bore by the cutter tool.

3. In the machine tool assembly of claim 2, said positioning means having a stop thereon, an adjustable abutment for engaging said stop when said positioning means locates said draw bar in its retracted position during stroking of said cutting tool and rotation thereof by said spindle means.

4. In the machine tool assembly of claim 3, limit switch means responsive to axial movement of said spindle housing to condition said driven member into its abutment position with said stop.

5. In the machine tool assembly of claim 3
a double acting hydraulic motor;
connecting means for connecting said double acting motor to said driven member;
means including said bearing means for supporting said draw bar for rotation with said spindle.

* * * * *